(12) United States Patent
Hatta et al.

(10) Patent No.: US 6,563,983 B2
(45) Date of Patent: May 13, 2003

(54) LASER DIODE MODULE

(75) Inventors: Tatsuo Hatta, Hyogo (JP); Satoshi Tamura, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/895,258

(22) Filed: Jul. 2, 2001

(65) Prior Publication Data

US 2002/0122632 A1 Sep. 5, 2002

(30) Foreign Application Priority Data

Mar. 2, 2001 (JP) .................................... 2001-058163

(51) Int. Cl.[7] .............................................. G02B 6/32
(52) U.S. Cl. ............................. 385/33; 385/37; 385/49; 372/6
(58) Field of Search ........................ 385/15, 31, 33–35, 385/37, 49; 372/6

(56) References Cited

U.S. PATENT DOCUMENTS

| | | | | |
|---|---|---|---|---|
| 5,485,481 A | * | 1/1996 | Ventrudo et al. | 372/6 |
| 5,699,377 A | * | 12/1997 | Pan | 372/92 |
| 5,724,377 A | | 3/1998 | Haung | |
| 5,845,030 A | * | 12/1998 | Sasaki et al. | 385/88 |
| 5,940,557 A | * | 8/1999 | Harker | 385/33 |
| 5,978,400 A | * | 11/1999 | Campbell et al. | 372/46 |
| 6,044,093 A | * | 3/2000 | Ventrudo et al. | 372/6 |
| 6,188,705 B1 | * | 2/2001 | Krainak et al. | 372/32 |
| 6,215,809 B1 | * | 4/2001 | Ziari et al. | 372/96 |
| 6,273,620 B1 | * | 8/2001 | Kato et al. | 385/88 |
| 2001/0036204 A1 | * | 11/2001 | Hatta et al. | 372/6 |
| 2002/0106156 A1 | * | 8/2002 | Vail et al. | 385/37 |

FOREIGN PATENT DOCUMENTS

| | | | | | |
|---|---|---|---|---|---|
| JP | 06138322 A | * | 5/1994 | | G02B/05/32 |
| JP | 2001251014 A | * | 9/2001 | | H01S/05/14 |

* cited by examiner

Primary Examiner—Akm E. Ullah
Assistant Examiner—Michelle R. Connelly-Cushwa
(74) Attorney, Agent, or Firm—Burns, Doane, Swecker & Mathis, LLP (57) ABSTRACT

In a laser diode module of the invention, a coupling optical system is inclined in an xz plane with respect to an optical axis (z axis) of outgoing light of a laser diode. More specifically, a coupling angle θlens of a laser diode and a lens is adjusted and fixed with a precision of 0.1° while monitoring a light output. By the operation, the coupling angle θlens is adjusted to an angle at which a light output which can be emitted without causing a kink becomes the maximum. As a result, even when the wavelength of the outgoing light is fixed by using a fiber grating, light can be emitted without causing a kink. Thus, a laser diode module capable of sufficiently increasing the maximum value of a light output can be obtained.

13 Claims, 8 Drawing Sheets

LASER DIODE MODULE

BACKGROUND OF THE INVENTION

1. Field of the Invention

The present invention relates to a laser diode module (hereinbelow, called an "LD module") used as a light source for exiting an optical fiber amplifier.

2. Description of the Background Art

Figure 15:
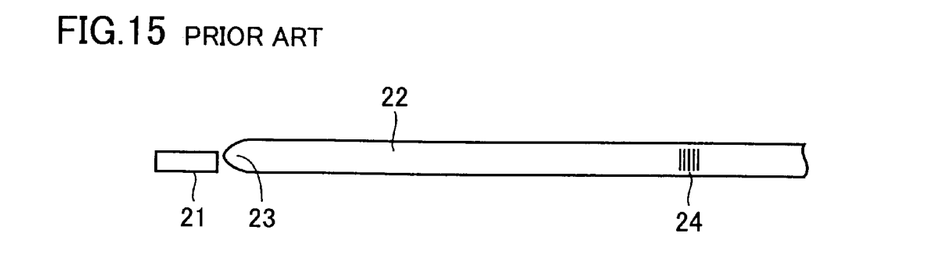
FIG. 15 is a diagram showing a schematic structure of an LD module according to a conventional technique.

FIG. 15 is a diagram showing the schematic structure of a conventional LD module disclosed in U.S. Pat. No. 5,724,377. The LD module has a laser diode hereinbelow, called an "LD") 21 and an optical fiber 22 disposed on an optical path of outgoing light of the LD 21. The LD 21 is an LD that oscillates at a wavelength of 982 nm in a state where there is no optical feedback. The optical fiber 22 has a micro lens processed portion 23 at its tip on the light incident side, and has a fiber grating (hereinbelow, called an "FG") 24 having a reflection center wavelength of 980 nm in its part. Generally, the FG denotes a portion formed so that the refractive index periodically changes in the optical fiber and, by the cycle of the change in refractive index, has a property that only light having a specific wavelength is reflected by only a predetermined quantity in accordance with the degree of a change in the refractive index. The FG can be formed by photosensitizing the optical fiber with ultraviolet rays.

A laser beam as outgoing light from the LD 21 enters the microlens processed portion 23, thereby being converted from diffusion light to parallel rays. The parallel rays propagate through the optical fiber 22. A part of the laser beam propagating through the optical fiber 22 to the FG 24 is reflected by the FG 24 and re-enters the LD 21. In the structure where a compound cavity is formed in such a manner, the oscillation wavelength of the LD 21 is not 982 nm as stated above but 980 nm as the reflection center wavelength of the FG 24 and is locked at 980 nm. That is, irrespective of a forward current passed to the LD 21 and temperature environment in which the LD is disposed, a light output at the wavelength of 980 nm can be stably obtained.

Figure 16:
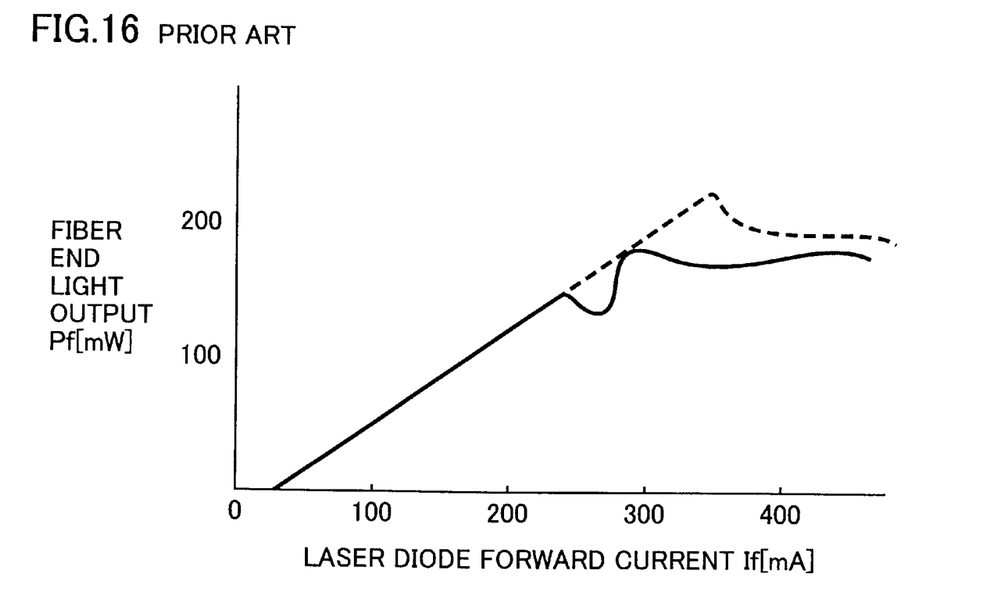
FIG. 16 is a graph showing the relation between a fiber end light output (Pf) and an LD forward current (If) according to the conventional technique.

FIG. 16 shows the relation between a fiber end light output Pf at a laser beam outgoing end of the optical fiber 22 and an LD forward current If with respect to the case where the FG 24 is provided in the optical fiber 22 to make the laser beam re-enter the LD 21 as described above and the case where the FG 24 is not provided. The broken line indicates the characteristic in the case where no FG 24 is provided, and the solid line indicates the characteristic in the case where the FG 24 is provided. As obviously understood from FIG. 16, the maximum value of the light output which can be emitted without causing a kink (hereinbelow, called a "kink-free light output") deteriorates considerably and there is a problem such that only the light output of about ⅔ of the case where no FG 24 is provided can be used. The "kink" denotes a phenomenon that due to occurrence of beam steering, the linearity between the light output of the optical fiber and the forward current passed to the LD is lost. The details will be described hereinlater.

SUMMARY OF THE INVENTION

An object of the present invention is to obtain an LD module capable of sufficiently increasing a kink-free light output even under the situation that the wavelength of outgoing light is fixed to a predetermined value by using an FG.

According to one aspect of the invention, a laser diode module according to the invention has: a laser diode of which oscillation wavelength is fixed at a predetermined wavelength; a fiber disposed on an optical path of outgoing light of the laser diode, in a part of which a fiber grating is formed; and a coupling optical system for optically coupling the laser diode and the fiber. An optical axis of the coupling optical system is inclined with respect to an optical axis of outgoing light of the laser diode by a predetermined angle in a plane parallel to an active layer of the laser diode.

With such a configuration, the coupling between the first-order lateral mode and the propagation mode of the fiber can be suppressed, and a kink-free light output can be increased.

In an embodiment of the laser diode module, a lens is used as the coupling optical system, and the optical axis of the coupling optical system is inclined by the predetermined angle by displacing a position of the lens with respect to the laser diode by a predetermined distance in a direction perpendicular to the optical axis of the outgoing light of the laser diode and parallel to the active layer of the laser diode.

With such a configuration, difficult angle adjustment and angle fixing can be carried out by distance adjustment in the x-direction which is relatively easy, so that the angle adjustment can be relatively easily realized at low cost.

Preferably, the optical axis of the coupling optical system is inclined by an angle so that a light output which can be emitted from the fiber without causing a kink becomes the maximum. Thus, a kink-free light output can be set to the maximum.

According to another aspect of the invention, a laser diode module of the invention has: a laser diode of which oscillation wavelength is fixed at a predetermined wavelength; a fiber disposed on an optical path of outgoing light of the laser diode, in a part of which a fiber grating is formed; and a coupling optical system for optically coupling the laser diode and the fiber. A position of the laser diode with respect to the coupling optical system is displaced only by a predetermined distance in a direction perpendicular to an optical axis of outgoing light of the laser diode and parallel to an active layer of the laser diode.

With such a configuration as well, the coupling between the first-order lateral mode and the propagation mode of the fiber can be suppressed, and the kink-free light output can be increased.

Preferably, a position of the laser diode with respect to the coupling optical system is displaced only by a distance so that a light output which can be emitted from the fiber without causing a kink becomes the maximum. Thus, the kink-free light output can be set to the maximum.

The oscillation wavelength of the laser diode is, preferably, fixed to a wavelength at which reflectance by the fiber grating becomes the maximum. Consequently, the wavelength of outgoing light can be fixed to a predetermined value.

As the laser diode, for example, a laser diode of a ridge waveguide type is employed. While using the most of the high output as an advantage of the ridge waveguide type, a lateral mode controllability as a drawback is overcome, so that a kind-free light output can be increased.

In a preferred embodiment of the invention, an inclined polished face is provided as an end face on the laser diode side of the fiber, and a normal of the polished face and that of the active layer of the layer diode are in the same plane. With the configuration, symmetry with respect to the optical axis in the x direction of the laser diode module is improved and the laser oscillation is performed symmetrically in the lateral direction. Consequently, generation of a high-order lateral mode can be suppressed, and a kink-free light output can be increased.

Preferably, a polarization-preserving optical fiber having a mode-enlarged end portion on the laser diode side of the fiber is used. By the mode-enlarged portion of the polarization-preserving optical fiber, the optical axis can be adjusted. Thus, angle and position can be adjusted and fixed with very high precision. An effect such that matching between the flat shape of outgoing light of the laser diode and the propagation mode of the fiber and fine adjustment for enlargement of an optical path can be realized by a single part at low cost is produced.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment
(Configuration)

Figure 1:
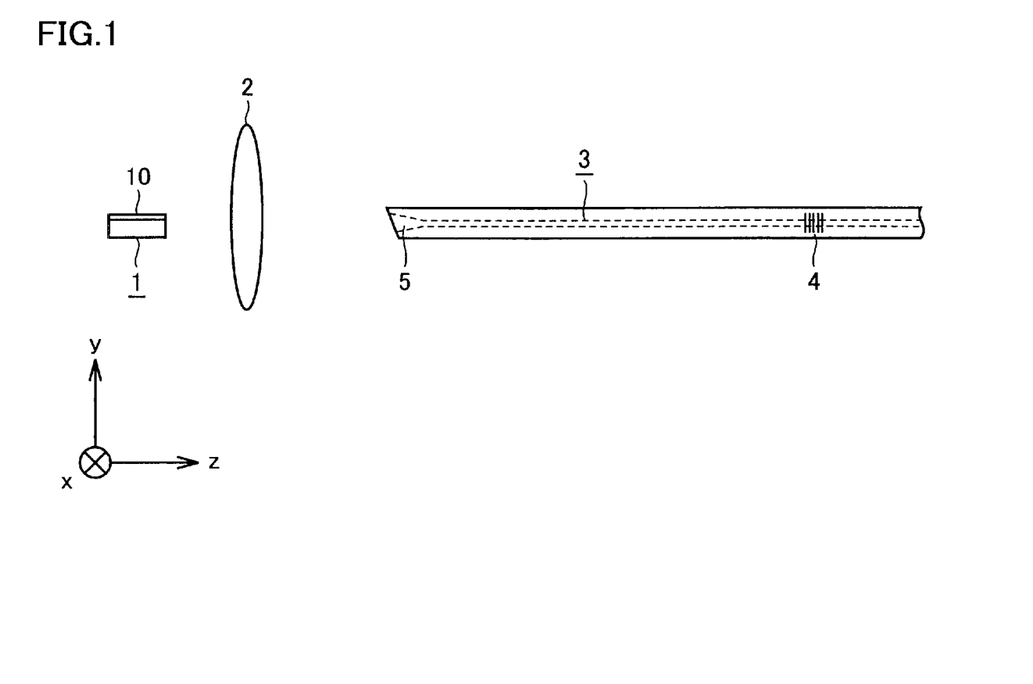
FIG. 1 is a diagram showing the schematic structure of an LD module according to a first embodiment of the invention.

An LD module according to a first embodiment of the invention has, as shown in FIG. 1, an LD 1, a lens 2 disposed in an optical path of outgoing light of the LD 1, a polarization-preserving optical fiber 3 disposed in a position where outgoing light from the LD 1 converges so that the light can enter the optical fiber 3 and processed so as to preserve a polarization state of the outgoing light of the LD 1, an FG 4 of a short cycle formed by irradiating a part of the polarization-preserving optical fiber 3 with ultraviolet rays, and a core enlarged portion 5 formed by diffusing the composition of the core by heating an end face of the LD side of the polarization-preserving optical fiber 3.

Figure 2:
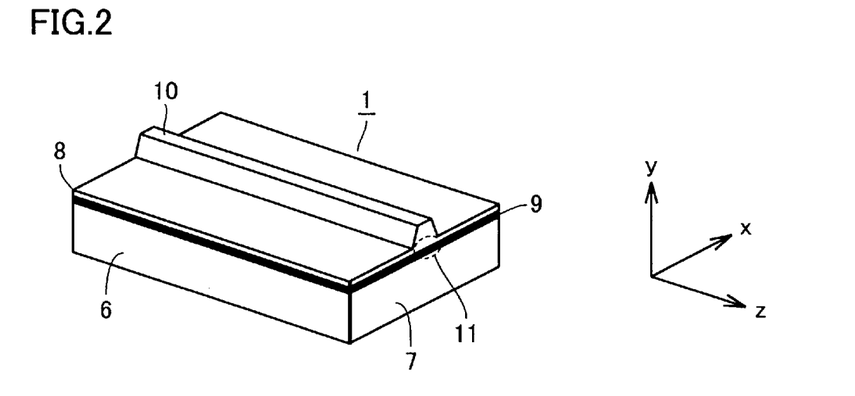
FIG. 2 is a perspective view of the LD in the first embodiment of the invention.
Figure 3:
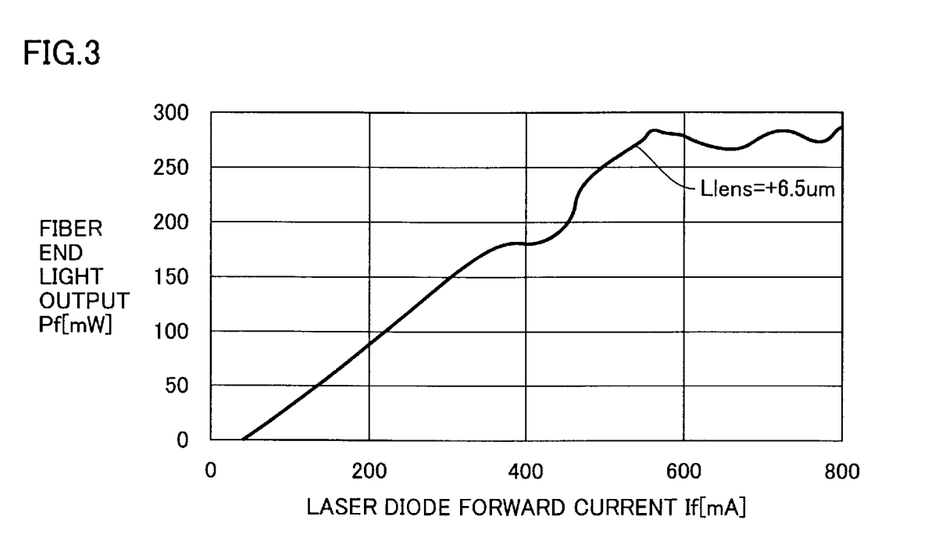
FIGS. 3 to 9 are graphs each showing the relation between a fiber end light output and a forward current passed to the LD in the LD module according to the first embodiment of the invention when a lens location Llens is +6.5 $\mu$m, ±0 $\mu$m, −3 $\mu$m, −6.5 $\mu$m, −8 $\mu$m, −10 $\mu$m, and −12 $\mu$m.
Figure 4:
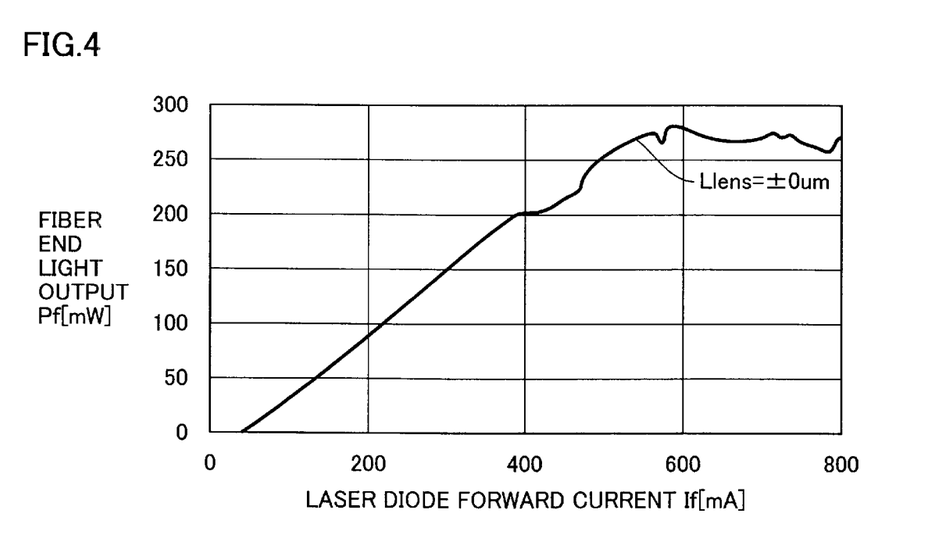
Figure 5:
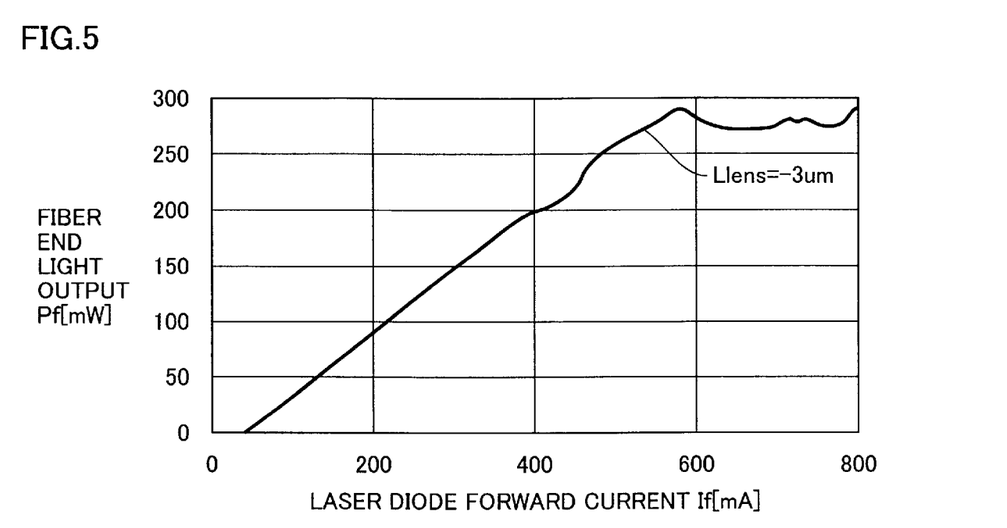
Figure 6:
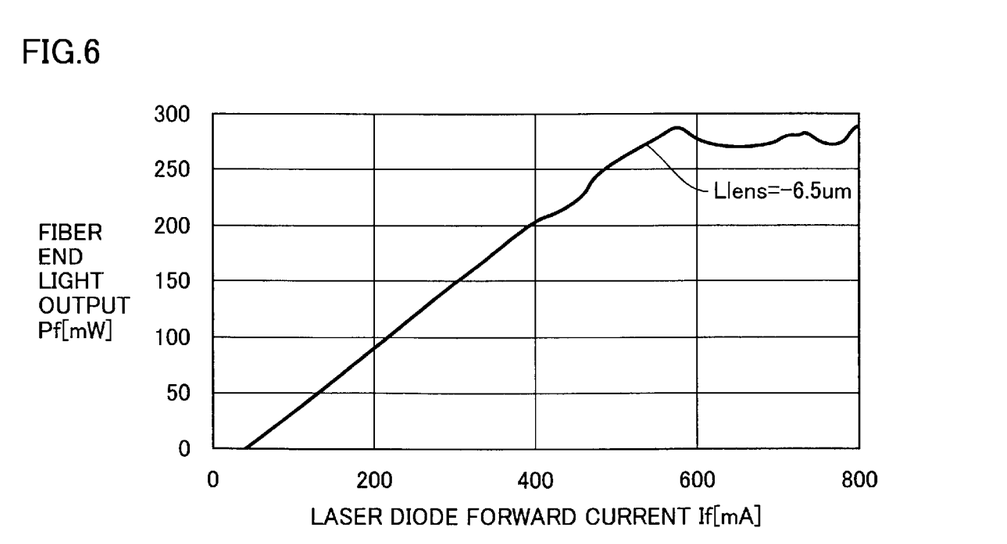

Referring to FIG. 2, the configuration of the LD 1 will be described. The LD 1 has an AlGaAs semiconductor substrate 6 as a base material. On the light outgoing face side of the LD 1, a front face reflecting mirror 7 having a reflectance of 0.5 to 1% formed by evaporation-depositing a plurality of dielectric films is provided. On the rear face side opposite to the light outgoing face side, a rear face reflecting mirror 8 having a reflectance of 95 to 99% formed by evaporation-depositing a plurality of dielectric films is provided. On the AlGaAs semiconductor substrate 6, an optical waveguide layer 9 formed by crystal growth is provided. On the optical waveguide layer 9, a ridge 10 is formed by etching. A laser beam oscillated by the LD 1 goes out from a laser outgoing portion 11. For the explanation, a direction parallel with the ridge 10 in FIG. 2 is set as a z axis, a direction parallel with the optical waveguide layer 9 and perpendicular to the z axis is set as an x axis, and a direction perpendicular to the z and x axes is set as a y axis.

(Outline of Operation)

The operation will now be described. In FIG. 1, outgoing light from the LD 1 is converged by the lens 2 and enters the propagation mode of the polarization-preserving optical fiber 3. A part of propagation light in the polarization-preserving optical fiber 3 is reflected by the FG 4 and returned to the LD 1. The reflection center wavelength of the FG 4 is 980 nm, a peak reflectance is 5%, and a half width of a reflection spectrum is 1.0 nm. By the reflection return light from the FG 4, the oscillation wavelength of the laser is locked at around 980 nm, so that the LD 1 stably oscillates around 980 nm irrespective of the forward current passing through the LD 1 and the temperature.

The LD 1 and the FG 4 form a compound cavity. Since there is a spacing of 1 m between the LD 1 and the FG 4, the phase of the reflection return light is disturbed. Phase noise of the laser beam accordingly increases. Therefore, the coherence of the LD module having such an FG is low. The low coherence is unpreferable since it causes noise degradation when the LD module serves as a light source used for communication or the like. However, when the LD module is used as a light source for exciting an optical fiber amplifier, such noise is not a problem, rather it is convenient since output and wavelength are moderately stable against external disturbance.

(Mechanism of Oscillation)

The operation of the LD 1 will now be described by referring to FIG. 2. The optical waveguide layer 9 is a gain medium which supplies the forward current and has a gain around 982 nm. The gain medium is sandwiched by a resonator formed by the front face reflecting mirror 7 and the rear face reflecting mirror 8, and the LD 1 alone oscillates around 982 nm. The gain peak wavelength of the LD 1 alone is 982 nm. The laser beam is confined in a width of about 3.7 $\mu$m in the x direction by an effective index difference generated by the ridge 10 and is confined in a height of about 1.6 $\mu$m by the optical waveguide layer 9 in the y direction. When such an LD operates with a high output of 100 mW or higher, generally, an optical spectrum spreads by about 10 nm and the number of oscillation longitudinal mode increases to tens.

The x and y directions are called lateral modes. Oscillation only in a lowest unimodal single mode is indispensable to increase the quality of a laser resonator and increase the optical coupling efficiency with the polarization-preserving optical fiber. The shapes of the ridge 10 and the optical waveguide layer 9 are designed so that light does not propagate in a high-order lateral mode.

(Occurrence of Kink)

The optical waveguide layer 9 is formed by crystal growth and maintains the single lateral mode even with a high current, so that a stable single lateral mode is obtained in the y direction. In the x direction, however, since an effective index difference obtained by the ridge shape is small, confinement is relatively weak. When a heavy current is passed, oscillation occurs also in a higher mode because the temperature of an area to which the current is passed due to an increase in the forward current rises and the refractive index increases. The maximum current by which the single lateral mode is obtained is, although it depends on the structure of the laser, about 350 mA in the case where the resonator length is 1.5 mm. Consequently, when the current is 350 mA or higher, propagation light in a higher lateral mode exists, and "beam steering" as a phenomenon that the shape or the outgoing direction of a laser beam is distorted occurs. When such beam steering occurs, in the case where the laser beam is coupled with the optical fiber, the linearity between the light output in the optical fiber and the forward current passed to the LD is lost. The upper limit of a usable light output is therefore limited. The phenomenon that the linearity between the light output in the optical fiber and the forward current passed to the LD is lost due to the occurrence of the beam steering is called a "kink".

(Examination by the Inventors)

The inventors of the present invention made it experimentally clear that the occurrence of the kink depends on the positional relation between the LD and the optical system in the LD module having such a configuration.

Figure 7:
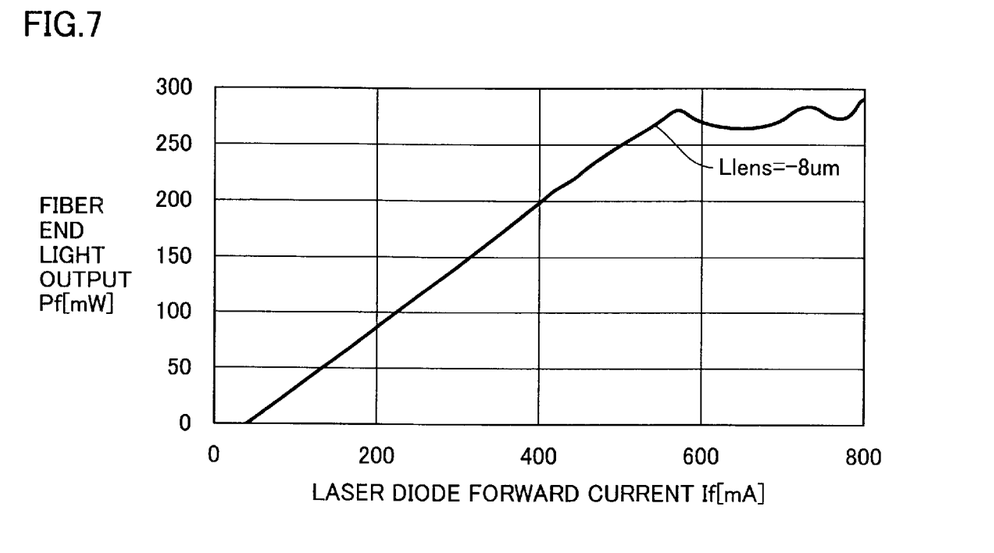
Figure 8:
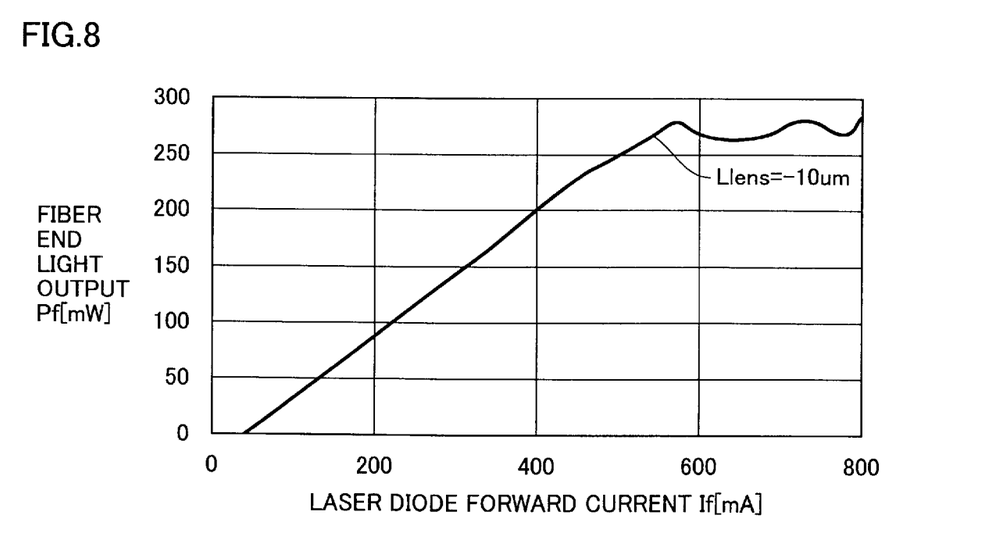
Figure 9:
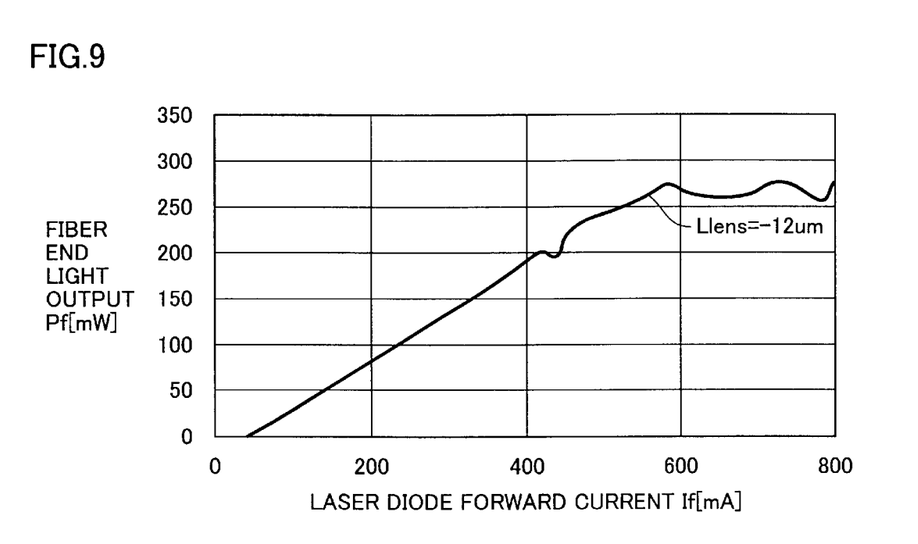

FIGS. 3 to 9 show results of measurement of the relation between an offset amount Llens in the x direction with respect to an LD outgoing optical axis (z axis) of the lens 2 and a Pf-If characteristic. In the measurement, each time the lens 2 is offset in the x direction, an incident mode of the fiber 3 is re-adjusted so as to achieve the maximum coupling efficiency. As shown in FIG. 7, when Llens=−8 $\mu$m, a dip which is seen around If=400 mA almost dissipates, and a kink-free light output of 280 mW is obtained.

(Mechanism of Kink Suppression)

When the lens 2 is offset in the x direction, the optical axis connecting the LD 1 and the fiber 3 is inclined in a xz plane with respect to the outgoing optical axis of the LD 1. An improvement in kink-free light output by offsetting of the lens can be understood as follows.

When a high-order lateral mode of the LD 1 is excited, a kink occurs. In order to improve the kink-free light output, therefore, it is sufficient to lower the ratio of coupling of the reflection return light from the FG 4 with the high-order lateral mode as much as possible. Since the field distribution of the fundamental lateral mode in the x direction is an even function, the coupling efficiency becomes the maximum when the axial deviation in the x direction is zero and an angle deviation is zero. The field distribution of the first-order lateral mode is, however, an odd function, and the coupling efficiency increases when the axial deviation or the angle deviation occurs.

Figure 10:
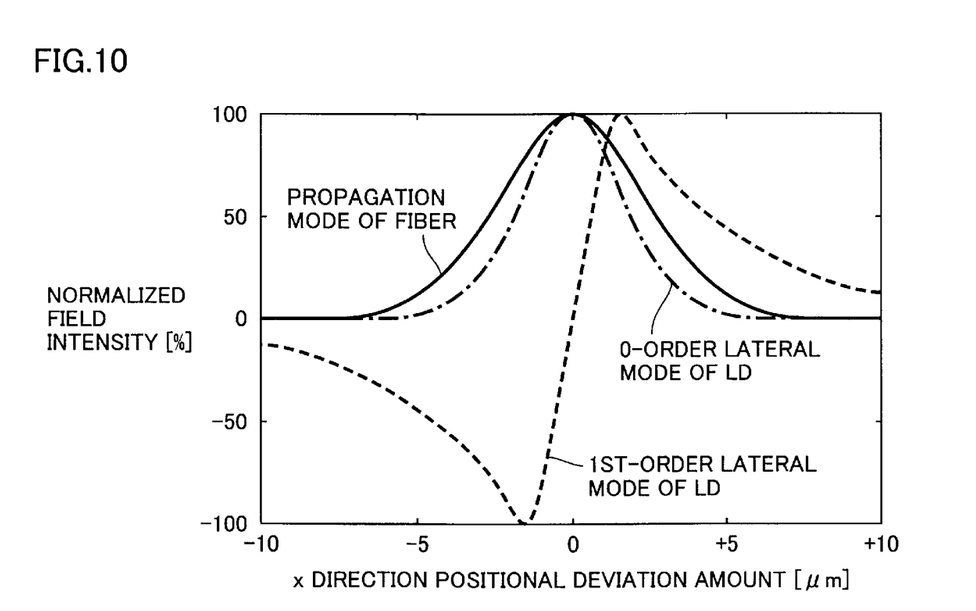
FIG. 10 is a graph showing a distribution in the (x) direction of field intensity of an LD and a fiber in the LD module according to the first embodiment of the invention.
Figure 11:
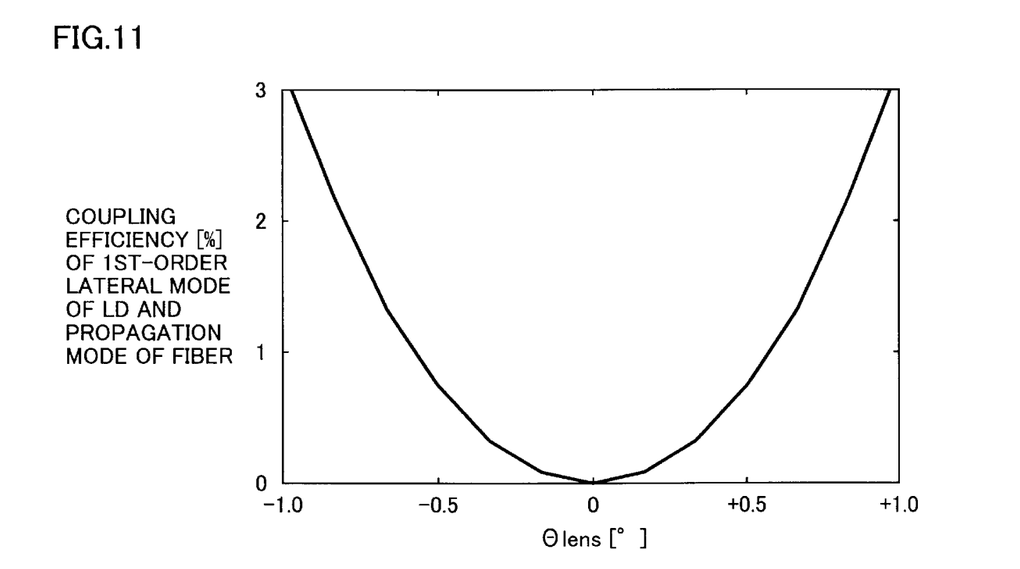
FIG. 11 is a graph showing the relation between an inclined angle ($\theta$lens) of a coupling optical system and a coupling efficiency between a first-order lateral mode of the LD and a propagation mode of the fiber in the LD module according to the first embodiment of the invention.

FIG. 10 shows a distribution in the x direction of the field intensity of each of the zero-order lateral mode, first-order lateral mode, and fiber propagation mode in a laser beam outgoing position 11. FIG. 11 shows the relation between an inclination angle θlens when the optical axis of the lens 2 is inclined with respect to the outgoing optical axis of the LD 1 and the coupling efficiency of the first-order lateral mode of the LD 1 and the propagation mode of the fiber 3. It is understood from FIG. 11 that the coupling efficiency increases the more the optical axis of the lens 2 is inclined. In an ideal combination of the parts, the coupling efficiency of reflection return light from the FG 4 and the high-order lateral mode of the LD 1 is zero when θ=0°. In practice, due to various asymmetries in the x direction existing in the LD, optical system, fiber polishing angle, and the like, excitation in the high-order lateral mode is stopped in a position where the coupling efficiency is slightly deviated from θ=0°. It is therefore considered that the kink-free light output is the highest when Llens=−8 um. Since the experiment uses an optical system in which the distance between the LD and the lens is 1 mm and the distance between the lens and the fiber is 5 mm, −8 um of Llens corresponds to an inclination of an optical system of −0.5°.

Figure 12:
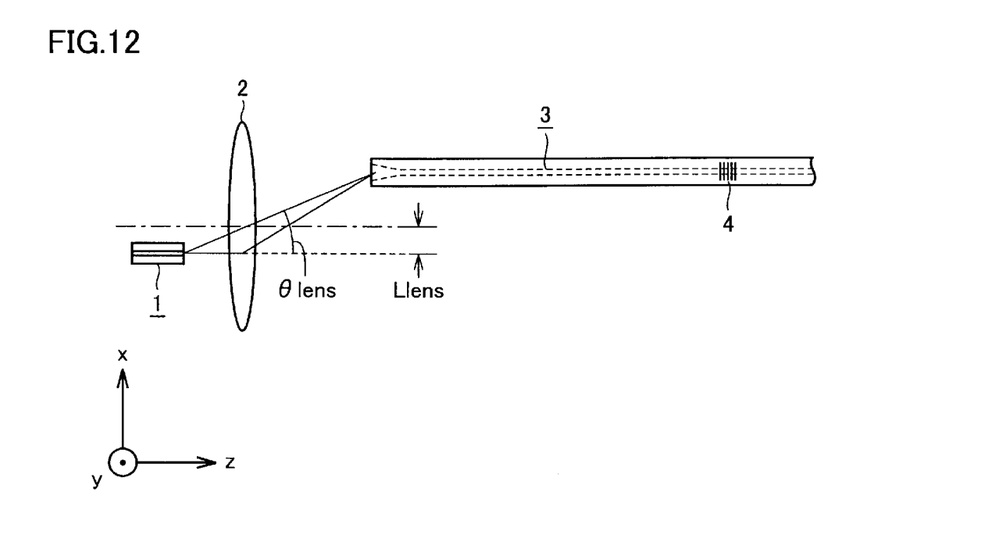
FIG. 12 is a diagram for explaining an optically coupled state of the LD and a polarization-preserving optical fiber in the LD module according to the first embodiment of the invention.

It is understood from FIGS. 3 to 9 that occurrence of a kink depends on the lens position Llens very much and the optical axis has to be therefore adjusted so that Llens lies in the range about from −8 um to −10 um. This corresponds to the angle range of 0.1°. As shown in FIG. 12, therefore, in the embodiment, a coupling angle θlens of the LD 1 and the lens optical system 2 is adjusted and fixed with a precision of 0.1° while monitoring the light output, thereby obtaining a kink-free optical output of 280 mW as shown in FIG. 7.

(Examination of Higher Precision)

As stated above, since a kink occurs due to generation of a high-order lateral mode in the x direction, the optical axis has to be adjusted with very high precision. The adjustment of the optical axis is realized by enlargement of the core in the end face of the polarization-preserving optical fiber 4. The mode field diameter of the polarization-preserving optical fiber is usually 6.6 $\mu$m. In the core enlarged portion, it is enlarged to about 15 $\mu$m, and the mode field diameter in the x direction and that in the y direction are different from each other so as to match a flat shape of the beam emitted from the LD. Consequently, an effect such that a high coupling efficiency and easy optical axis adjustment can be simultaneously realized is produced.

(Use of Ridge Waveguide Type LD)

According to the embodiment, a ridge waveguide type 982 nm oscillation LD of a high output but a weak lateral mode control is used and the coupling magnification of the optical fiber 3 is set so that the fundamental lateral mode in the x direction of the LD 1 and the fundamental lateral mode of the fiber 3 are aligned with each other. Consequently, an effect such that the excitation in the high-order lateral mode by the reflection light can be suppressed while increasing an output of the device alone and the kink-free light output can be increased is produced.

According to the embodiment, as shown in FIG. 1, the fiber end face is polished in the direction where the normal of the inclined polished face of the fiber 3 and the normal of the active layer 9 are in the same plane. Consequently, an effect such that asymmetry of the optical system does not easily occur in the x direction and the kink-free light output is increased is produced.

Second Embodiment

In the foregoing first embodiment, the coupling optical system is inclined in the xz plane with respect to the LD outgoing optical axis (z axis). Even when the LD 1 is displaced by a very small amount in the x axis direction, similar effects are produced.

Figure 13:
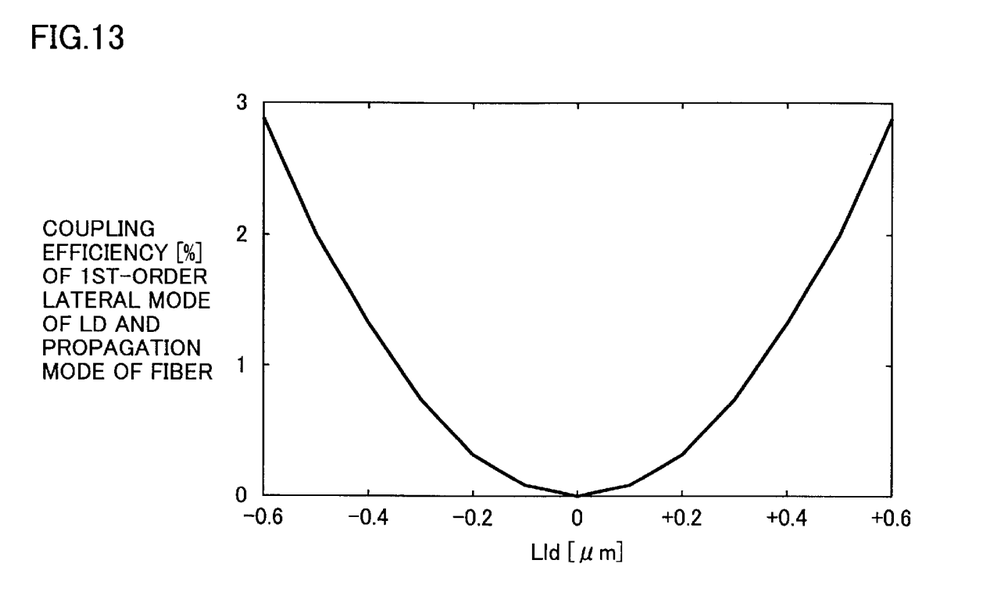
FIG. 13 is a graph showing the relation between a lateral deviation amount (Lld) in the (x) direction of the LD and a coupling efficiency of a first-order lateral mode of the LD and a propagation mode of the fiber in an LD module according to a second embodiment of the invention.

FIG. 13 shows the relation between an axial deviation amount Lld in the x axis direction of the LD 1 and the coupling efficiency. The relation behaves similar to the relation between the angle deviation and the coupling efficiency shown in FIG. 11.

Figure 14:
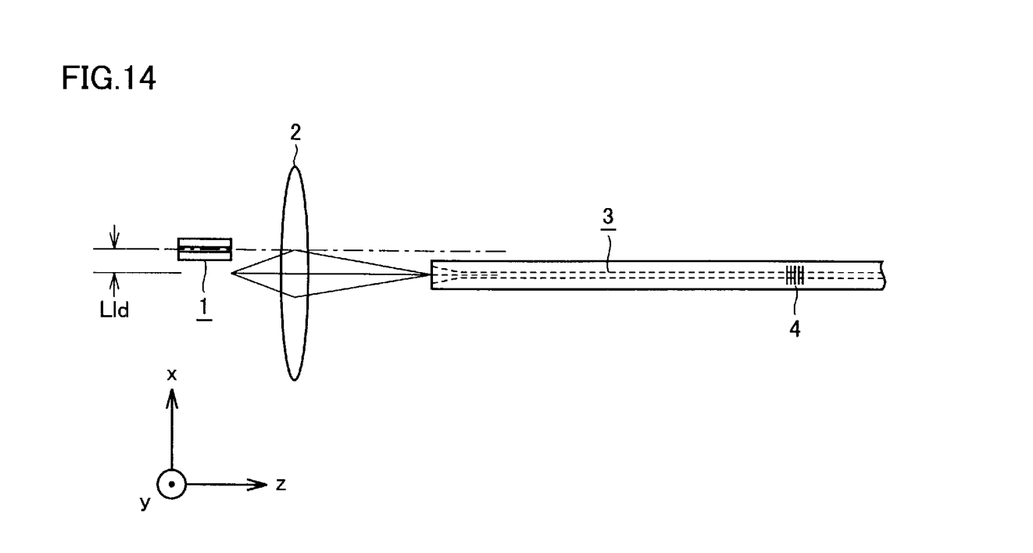
FIG. 14 is a diagram for explaining an optically coupled state of an LD and a polarization-preserving optical fiber in the LD module in the second embodiment of the invention.

FIG. 14 shows an LD module in the embodiment. In the LD module, the kink-free light output is improved by adjusting the position of the LD 1 with respect to the lens optical system 2 in the x direction. The configuration of the other portion is the same as that in the LD module in the first embodiment.

In practice, by performing both adjustment of the coupling angle of the coupling optical system shown in FIG. 12 and adjustment of the positional deviation in the x direction of the LD with respect to the coupling optical system shown in FIG. 14, the kink-free light output can be increased the most.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A laser diode module comprising:

a laser diode of which oscillation wavelength is fixed at a predetermined wavelength;

a fiber disposed on an optical path of outgoing light of said laser diode, in a part of which a fiber grating is formed; and a coupling optical system for optically coupling said laser diode and said fiber, wherein an optical axis of said coupling optical system is inclined with respect to an optical axis of outgoing light of said laser diode by a predetermined angle in a plane parallel to an active layer of said laser diode.

2. The laser diode module according to claim 1, wherein a lens is used as said coupling optical system, and the optical axis of said coupling optical system is inclined by said predetermined angle by displacing a position of said lens with respect to said laser diode by a predetermined distance in a direction perpendicular to the optical axis of the outgoing light of said laser diode and parallel to the active layer of said laser diode.

3. The laser diode module according to claim 1, wherein said predetermined angle is set so that a light output which can be emitted from the fiber without causing a kink becomes the maximum.

4. The laser diode module according to claim 1, wherein the oscillation wavelength of said laser diode is fixed to a wavelength at which reflectance by said fiber grating becomes the maximum.

5. The laser diode module according to claim 1, wherein said laser diode is of a ridge waveguide type.

6. The laser diode module according to claim 1, wherein an inclined polished face is provided as an end face on said laser diode side of said fiber, and a normal of said polished face and a normal of the active layer of said laser diode are in the same plane.

7. The laser diode module according to claim 1, wherein a polarization-preserving optical fiber having a mode-enlarged end portion on said laser diode side of said fiber is used.

8. A laser diode module comprising:

a laser diode of which oscillation wavelength is fixed at a predetermined wavelength;

a fiber disposed on an optical path of outgoing light of said laser diode, in a part of which a fiber grating is formed; and a coupling optical system for optically coupling said laser diode and said fiber, wherein a position of said laser diode with respect to said coupling optical system is displaced only by a predetermined distance in a direction perpendicular to an optical axis of outgoing light of said laser diode and parallel to an active layer of said laser diode.

9. The laser diode module according to claim 8, wherein a position of said laser diode with respect to said coupling optical system is displaced only by a distance so that a light output which can be emitted from the fiber without causing a kink becomes the maximum.

10. The laser diode module according to claim 8, wherein the oscillation wavelength of said laser diode is fixed to a wavelength at which reflectance by said fiber grating becomes the maximum.

11. The laser diode module according to claim 8, wherein said laser diode is of a ridge waveguide type.

12. The laser diode module according to claim 8, wherein an inclined polished face is provided as an end face on said laser diode side of said fiber, and a normal of said polished face and that of the active layer of said laser diode are in the same plane.

13. The laser diode module according to claim 8, wherein a polarization-preserving optical fiber having a mode-enlarged end portion on the laser diode side of said fiber is used.

* * * * *